INVENTOR.
JAMES F. CLARKE

Aug. 30, 1960   J. F. CLARKE   2,950,597
APPARATUS FOR MINIMUM FUEL FLOW SCHEDULING
DURING DECELERATION OF AN ENGINE
Filed Dec. 5, 1956   2 Sheets-Sheet 2

INVENTOR.
JAMES F. CLARKE
BY
H.Y.Brodahl
ATTORNEY

United States Patent Office 2,950,597
Patented Aug. 30, 1960

2,950,597

APPARATUS FOR MINIMUM FUEL FLOW SCHEDULING DURING DECELERATION OF AN ENGINE

James F. Clarke, Levittown, Pa., assignor to The Bendix Corporation, a corporation of Delaware Filed Dec. 5, 1956, Ser. No. 626,476

7 Claims. (Cl. 60—39.28)

The present invention relates in general to fuel control apparatus, and more particularly to fuel control apparatus for an engine such as an internal combustion engine or the like.

In the operation of an internal combustion engine, such as a gas turbine engine, it may be desirable to schedule the deceleration operation fuel flow including an absolute minimum fuel flow to that engine. Thusly, a minimum deceleration fuel flow schedule may be provided as a function of some predetermined engine operating parameter, such as engine speed, and as the engine speed decreases finally the absolute minimum fuel flow schedule will be reached. For further decreases in the engine speed, the minimum fuel flow will be scheduled to the engine until it becomes desirable for some reason to increase the fuel flow above this minimum level or to shut down the operation of the engine.

Accordingly, it is an object of the present invention to provide an improved control apparatus for an engine such as a gas turbine or like internal combustion engine.

It is a further object of the present invention to provide an improved control apparatus for an engine, which apparatus is operative in an improved manner to vary the fuel flow to said engine as a function of some predetermined engine operating parameter or condition.

It is another object of the present invention to provide an improved fuel flow control apparatus for an engine, including a better scheduling of the fuel flow to the engine during deceleration of the engine.

It is a different object of the present invention to provide an improved fuel control apparatus for an engine for scheduling a minimum fuel flow to that engine as a function of engine speed.

It is an additional object of the present invention to provide an improved fuel control apparatus for an engine for providing an improved deceleration and/or minimum fuel flow schedule for that engine as a function of some engine operating parameter, such as engine speed, such that the fuel metering valve schedules a portion of the fuel flow to the engine and the latter fuel flow portion is supplemented for the desired operation of the engine.

These and other objects and advantages of the present invention will become apparent in view of the following description taken in conjunction with the drawings, wherein.

Figure 1:
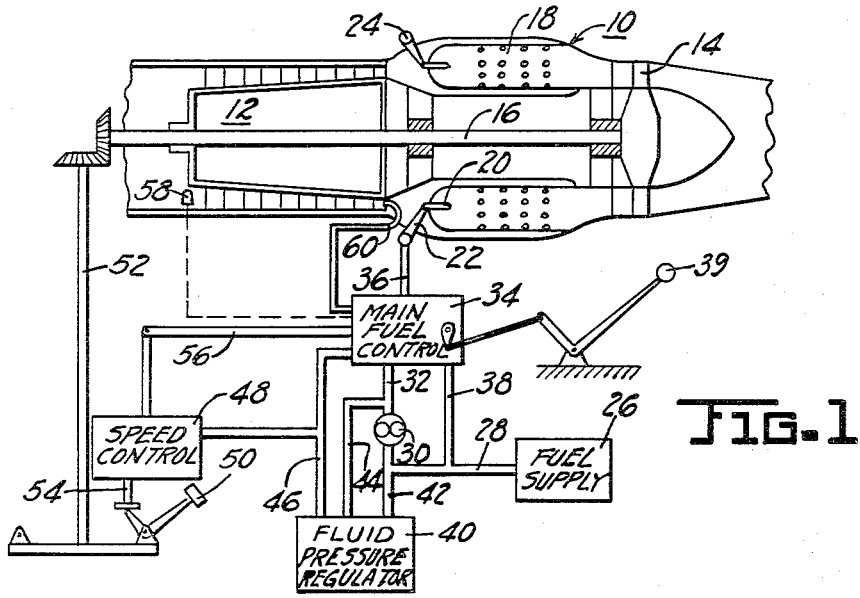
Figure 1 is a diagrammatic view of control apparatus in accordance with the present invention.

In Figure 1 there is shown a gas turbine engine 10 including a compressor 12 and a turbine 14 interconnected by a drive shaft 16. A plurality of combustion chambers 18 are provided with each including a fuel nozzle 20 connected through individual fuel lines 22 to a fuel manifold 24. Fuel is provided from a fuel supply 26 through a conduit 28 and a fuel pump 30, then through an outlet conduit 32 to a main fuel control 34 from which it passes through an outlet conduit 36 to the fuel manifold 24. A by-pass conduit 38 is provided and is operative in the conventional manner as well known to persons skilled in this art. A fluid pressure regulator 40 senses control fuel at pump inlet pressure through a conduit 42 and at pump outlet pressure to the conduit 44, and provides a pressure regulated control fluid through the conduit 46 connected to a speed control 48 and the main fuel control 34 as shown in Figure 1. An engine speed responsive member 50 is rotated as a function of engine speed through the engine connected mechanism 52, and applies a control force to a control arm 54 leading to the speed control 48. The output of the speed control 48 is applied through a control arm 56 to the main fuel control 34. An engine operational temperature responsive device 58 is connected for controlling the operation of the main fuel control 34, and a compressor operating pressure responsive device 60 is connected for controlling operation of the main fuel control 34.

Figure 2:
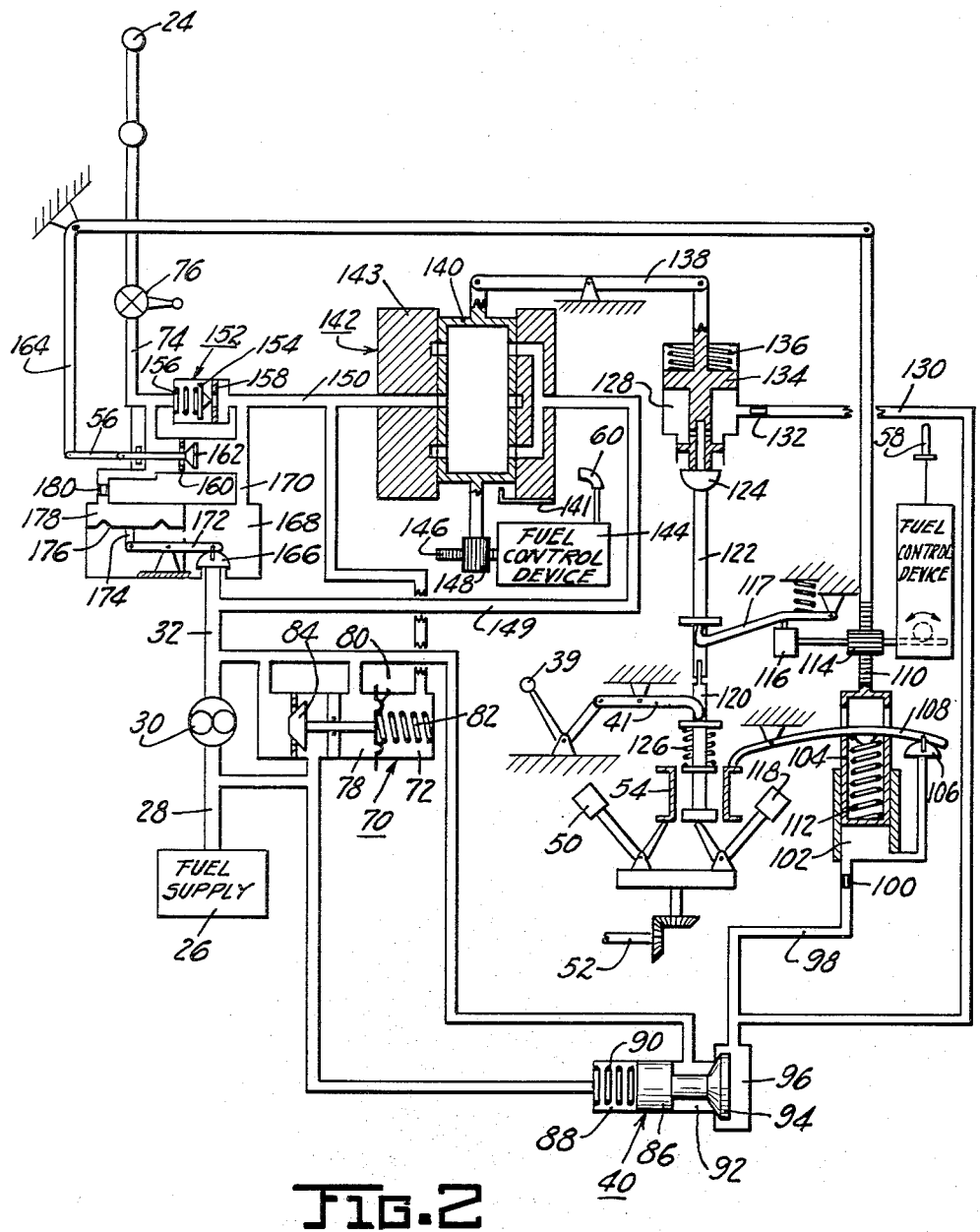
Figure 2 is a schematic view of control apparatus in accordance with the present invention.

In Figure 2 there is shown a schematic view of the control apparatus in accordance with the present invention, including a by-pass control valve 70 having a first chamber 72 responsive to the pressure of metered fuel sensed downstream of the metering valve. The fuel then flows to the main fuel manifold 24 through the outlet conduit 74 including a cut-off valve 76. The by-pass control 70 also includes a second chamber 78 responsive to fuel at pump outlet pressure from within the fuel conduit 32, which fuel chambers 72 and 78 are operative with a flexible diaphragm member 80 and a control spring 82 for controlling the position of a movable valve member 84 which determines the flow of fuel from the conduit 32 to the pump inlet conduit 28 and thereby regulates the fuel pressure within the outlet conduit 32.

The fluid pressure regulator 40 is shown comprising a valve member 86, positioned between a first chamber 88 including a control spring 90 and responsive to control fluid or fuel at pump inlet pressure from within the conduit 28 and a second fuel chamber 92 responsive to control fuel at pump outlet pressure within the outlet conduit 32, for regulating the position of the valve member 94 for providing pressure regulated control fluid within the fluid chamber 96. The latter fluid chamber 96 is connected through a conduit 98 including a control bleed or orifice member 100 to a fluid chamber 102 operative with a control piston 104 and a movable half-ball valve 106. The latter half-ball or flapper valve 106 is positioned as a function of engine speed as sensed by the speed responsive member 50 through the control arm 54 and the second control arm 108, such that the pressure of the control fluid within the fluid chamber 102 is varied as a function of engine speed to position the control piston 104 and its rack member 110 as a function of engine speed. A control spring member 112 is provided between the second control arm 108 and the piston member 104. The rack member 110 is operative with a pinion 114 which controls the position of an acceleration fuel flow scheduling or control cam 116. A second engine speed responsive member 118 is connected through a first control shaft 120 and a second control shaft 122 to control the position of a half-ball or flapper valve 124. The manual control throttle lever 39 is connected through the control arm 41 and operative with the governor spring 126 for controlling with the speed responsive member 118 the position of the half-ball or flapper valve 124. The latter half-ball valve 124 is operative with the fluid chamber 128, which is connected through a conduit 130 including a control bleed 132 with the fluid chamber 96 of the fluid pressure regulator 40, such that the position of the half-ball valve 124 determines the pressure of the control fluid within the fluid chamber 128 and thereby controls the position of the control piston 134 in conjunction with the control spring 136. The control piston 134 is connected through a control arm 138 to the movable valve member 140 of the metering valve 142 and is operative to control the axial position of the valve member 140 relative to the cooperating sleeve member 143. The compressor operating pressure responsive device 60 is operatively connected through a suitable control device 144 including a rack member 146 and a pinion 148 for controlling the rotary or rotational position of the valve member 140 as well known to persons skilled in this art.

Fuel is supplied from the pump 30 and the outlet conduit 32 through a conduit 149 and through the metering valve 142 to an outlet conduit 150. The outlet conduit 150 includes a check valve 152 including a movable valve member 154 and a control spring 156 operating with an orifice or restriction member 158. A second flow restriction member 160 is provided and includes a movable valve member 162, which movable valve member 162 is connected to the control arm 56 and the linkage member 164 operatively connected to the control piston 104 as previously described. A flow controlling half-ball or flapper valve 166 is provided for controlling the flow of fuel from the conduit 32 into the fuel chamber 168 and through the conduit 170 to the conduit 150 and/or through the restriction member 160 to the conduit 74. The position of the half-ball 166 is controlled by a pivoted control arm 172, operatively connected through a control shaft 174 to a flexible diaphragm member 176. The flexible diaphragm member 176 is responsive to the difference between the fluid pressure within the fluid chamber 168 and the fluid pressure within a second fluid chamber 178 connected through a control bleed or orifice member 180 to the fuel conduit 74 as shown in Figure 2.

Figure 3:
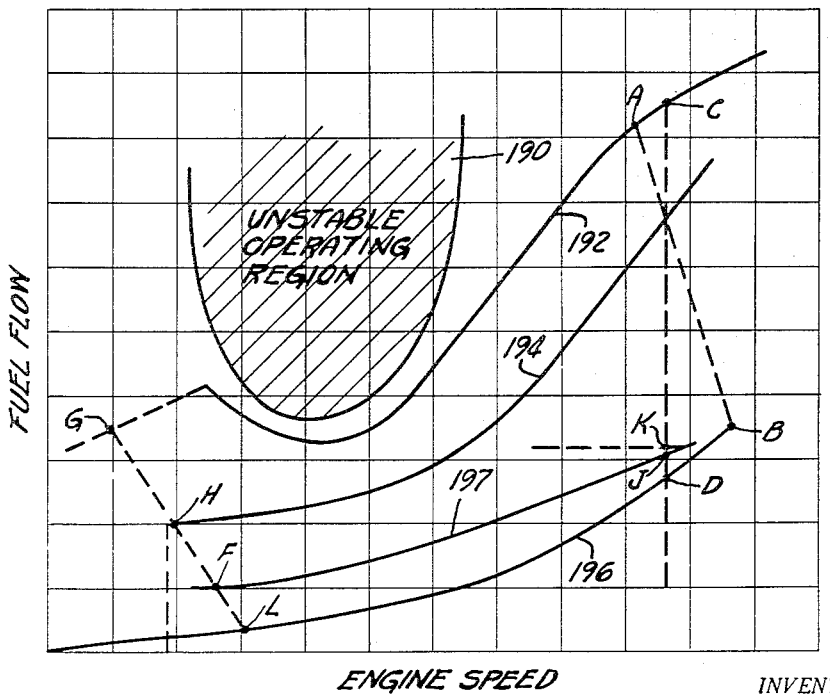
Figure 3 is a curve chart illustrating the operation of the control apparatus in accordance with the present invention.

In Figure 3 there is shown the engine unstable operating region 190 which may correspond to the stall or surge region of the axial compressor 12 shown in Figure 1. The accelerating fuel flow schedule 192 is shown, as well as the required to run fuel flow schedule 194 and the deceleration fuel flow schedule 196. The governor slope is illustrated by the line A, B between the acceleration curve 192 and the deceleration curve 196. The curve 197 represents the actual fuel flow to the engine during deceleration in accordance with the present invention. The difference of fuel flow between the curve 197 and the deceleration fuel flow schedule as shown by the curve 196 is provided by the flow through the half-ball or flapper valve 166 shown in Figure 2.

In the operation of the control apparatus in accordance with the invention, the fuel flow to the engine is scheduled in accordance with the engine speed as utilized to control the position of the half-ball valve 124 to thereby determine the axial position of the valve member 140 of the metering valve 142, and as a function of compressor discharge pressure as utilized through the rack member 146 and pinion 148 to control the rotational or rotary position of the valve member 140. During an acceleration operation of the engine, the acceleration fuel scheduling cam 116 is operative through its control arm 117 to determine the fuel flow schedule in accordance with the acceleration curve 192 as shown in Figure 3 by positioning the half-ball valve 124 and its control piston 134 to provide the desired acceleration fuel flow schedule. During a deceleration of the engine and in accordance with the present invention, as the fuel flow is controlled along the line C, D as shown in Fig. 3 from the required to run curve 194 in the direction of the deceleration fuel flow scheduling or control curve 196 the valve member 140 is moved axially by the engine speed responsive member 118 and its associated apparatus in conjunction with the control throttle member 39 and the governor spring 126 to close the half-ball valve 124 such that the metering valve member 140 is moved against the stop member 141 to provide a minimum axial position of the valve member 140 and a minimum area flow orifice between the valve member 140 and the cooperating sleeve 143 of the metering valve 142 as determined by the axial movement of the valve member 140. Then the compressor discharge pressure as sensed by the device 60 is operative to control the rotational position of the valve member 140 to thereby control the fuel flow along the deceleration curve 196 from the point D to the point L as illustrated by Figure 3. The difference in fuel flow between the deceleration curve 196 and the curve 197 is provided thru the half-ball 166, and is scheduled by the position of valve member 162.

At the engine speed corresponding to the point K just above the curve 197 the check valve or flow restriction valve member 154 closes the restriction member 158 since the control spring 156 is so operative below a predetermined fuel flow value through the restriction member 158 from the conduit 150 to the conduit 74.

The diaphragm 176 is responsive to the pressure difference across the check valve 152 and across the second restriction member 160 for controlling the operation of the half-ball 166. Also, there is a force exerted to open the half-ball 166 resulting from the greater fuel pressure within the conduit 32, as compared to the fuel pressure within the chamber 168, acting against the effective area of the half-ball 166 as exposed to the fuel within the conduit 32. Thusly, the half-ball 166 opens at point J as determined by the fuel pressure difference between conduits 32 and 150 acting against the effective area of half-ball 166, the lever ratio of lever 172, and the fuel pressure difference between conduits 150 and 74 acting on the effective area of the diaphragm 176. Therefore, when the latter fuel pressure difference goes below a predetermined fuel pressure difference, the half-ball valve 166 opens.

The fuel flow through the metering valve 142 follows the deceleration flow scheduling curve 196 as a function of compressor discharge pressure. The half-ball valve 166 is varied in position to provide the minimum fuel flow schedule in accordance with the curve 197 by controlling a substantially constant pressure drop across the minimum flow valve 162, and the fuel flow to the engine is then determined by the area of the minimum flow valve 162 until the fuel flow follows the governor slope along the governor slope curve F, G until the new point H on the required to run curve 194 is reached.

It should be understood that curve 197 has been illustrated as being almost linear relative to engine speed, however this curve 197 may have any desired variations in this regard as will be readily apparent to persons skilled in the art.

The check valve 152 closes at some fuel flow greater than that corresponding to point J, for example check valve 152 may close at point K if desired. The half-ball 166 opens at point J fuel flow to the engine, and is operative to maintain a substantially constant fuel pressure drop or difference across the control valve 162. The half-ball 166 provides the fuel flow difference to the engine between points J and D on the line C, D. At an engine speed corresponding to point L on the compressor discharge pressure determined deceleration fuel flow curve 196, the half-ball 166 begins to close and at point F on the curve 197 the half-ball 166 is closed.

Although the present invention has been described with a certain degree of particularity it should be understood that the present disclosure has been made only by way of example and that numerous changes in the details of construction and the combination and arrangement of parts may be resorted to without departing from the scope and spirit of the present invention.

I claim:
1. In fuel control apparatus for an engine operative with a fuel supply, the combination of a first fuel flow path provided between said supply and said engine, a second fuel flow path provided between said supply and said engine and connected in parallel with said first fuel flow path, with said first fuel flow path including a first fuel flow control member including a fuel pressure responsive member for maintaining a constant head across said first flow control member, with said second fuel flow path including a second fuel flow control member, an engine speed responsive device operatively connected to said second fuel flow control member for controlling the flow of fuel to said engine through said second fuel flow control path as a function of engine speed, and means responsive to the level of flow output from said first fuel flow control member for controlling the pressure drop across said second fuel flow control member.

2. In fuel control apparatus for an engine having a fuel manifold and operative with a fuel supply, the combination of a fuel conduit adapted for connection between said fuel supply and said manifold, said fuel conduit including a first fuel flow path and a second fuel flow path in parallel, said first fuel flow path including a metering valve member for controlling the flow through said first fuel flow path and a flow responsive device operative to close said first flow path when the flow through said first fuel flow path is below a predetermined amount, said second flow path including a flow restriction member, an engine speed responsive device operatively connected to said metering valve member for controlling the fuel flow through said first path to said engine as a function of engine speed and operatively connected to said restriction member for controlling the fuel flow to said engine through said second path as a function of engine speed, and a fuel pressure control device connected to sense the pressure drop across said flow responsive device and said flow restriction member for maintaining a predetermined fuel pressure difference across said restriction member.

3. In fuel control apparatus for an engine having a fuel manifold and operative with a fuel supply, the combination of a fuel conduit adapted for connection between said fuel supply and said manifold, said conduit including a first fuel flow path and a second fuel flow path in parallel, said first fuel flow path including a metering valve for controlling the fuel flow through said first flow path and a flow responsive device operative to close said first flow path when the fuel flow through said first flow path is below a predetermined amount, said second fuel flow path including a fuel flow restriction member responsive to the speed of said engine for controlling the effective area of said second fuel flow path, and means responsive to the flow through said first flow path for controlling the pressure drop across said fuel flow restriction member.

4. In a fuel system for an engine operative with a source of fuel, a fuel conduit connected between said source and said engine, a pump, a metering valve having axial and rotational movement, and a check valve in said fuel conduit in series flow relationship, an all-speed governor connected to said metering valve for controlling axial movement thereof, means responsive to a compressor generated pressure for controlling rotational movement of said valve, and a stop for limiting the axial movement of said valve in a flow decreasing direction: minimum flow control means including a conduit in parallel with said check valve, valve means for controlling the effective area of said conduit, engine speed responsive means for controlling the movement of said valve means, a fuel flow passage connected in parallel with said metering valve and communicating with the upstream side of said valve means, a control valve for controlling the flow through said passage, and pressure responsive means for sensing the pressure drop across said valve means and said check valve for controlling the position of said control valve.

5. In a fuel system for an engine operative with a source of fuel, a fuel conduit connected between said source and said engine, a pump, a metering valve having axial and rotational movement and a check valve in said fuel conduit in series flow relationship, an all-speed governor connected to said metering valve for controlling axial movement thereof, means responsive to a compressor generated pressure for controlling rotational movement of said valve, a stop for limiting the axial movement of said valve in a flow decreasing direction, and a pressure regulator for controlling the head across said metering valve: minimum flow control means including a conduit in parallel with said check valve, a valve in said conduit and engine speed responsive means for positioning said valve, a fuel flow passage connected to said fuel conduit upstream of said metering valve and to said conduit upstream of said valve, and pressure responsive means for sensing the pressure drop across said valve and said check valve for controlling the flow through said fuel flow passage.

6. In a fuel system for an engine operative with a fuel source, a fuel conduit connected between said source and said engine, a pump, a metering valve and a check valve in said fuel conduit in series flow relationship, and control means for controlling the effective flow through said metering valve: minimum flow control means including a conduit in parallel with said check valve, a valve in said conduit and engine speed responsive means for controlling said valve, pressure responsive means for sensing the pressure drop across said valve and said check valve, a fuel flow passage connected in parallel with said metering valve and communicating with the upstream side of said valve, and control valve means connected to said pressure responsive means for controlling the flow through said passage.

7. In a fuel system for an engine operative with a fuel source, a fuel conduit connected between said source and said engine, a pump, a metering valve and a check valve in said fuel conduit in series flow relationship, means for controlling the effective area of said metering valve, a pressure regulator for controlling the head across said metering valve: minimum flow control means including a conduit parallel with said check valve, a valve in said conduit and engine speed responsive means for positioning said valve, a fuel flow passage connected to said fuel conduit upstream of said metering valve and to said conduit upstream of said valve, and pressure responsive means for sensing the pressure drop across said valve and said check valve for controlling the flow through said fuel flow passage.

References Cited in the file of this patent

UNITED STATES PATENTS

| | | |
|---|---|---|
| 2,422,808 | Stokes | June 24, 1947 |
| 2,446,339 | Orr | Aug. 3, 1948 |
| 2,465,159 | Lee | Mar. 22, 1949 |
| 2,498,939 | Bobier | Feb. 28, 1950 |
| 2,604,756 | Greenland | July 29, 1952 |
| 2,644,513 | Mock | July 7, 1953 |
| 2,670,725 | Cummins | Mar. 2, 1954 |
| 2,674,847 | Davies et al. | Apr. 13, 1954 |
| 2,769,488 | Harris et al. | Nov. 6, 1956 |
| 2,836,957 | Fox | June 3, 1958 |

FOREIGN PATENTS

| | | |
|---|---|---|
| 727,201 | Great Britain | Mar. 30, 1955 |